May 11, 1937.  G. E. MIRFIELD  2,079,916
WELDING APPARATUS
Filed Feb. 26, 1934   4 Sheets-Sheet 1

INVENTOR
George E. Mirfield
by his attorneys
Byrnes, Stebbins & Blenko

May 11, 1937.  G. E. MIRFIELD  2,079,916
WELDING APPARATUS
Filed Feb. 26, 1934    4 Sheets-Sheet 2
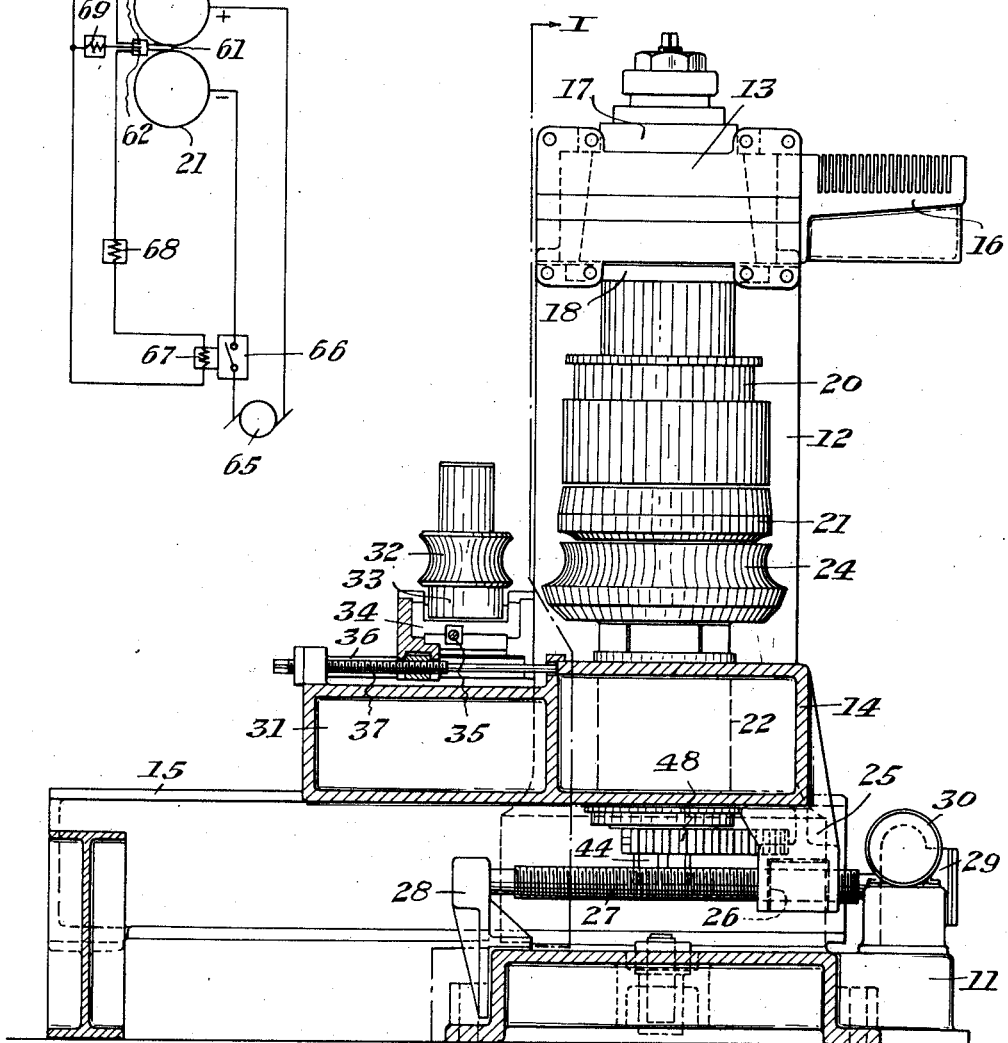
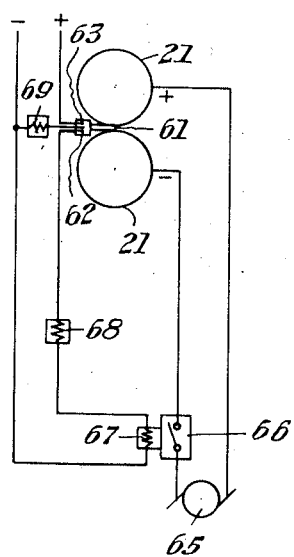
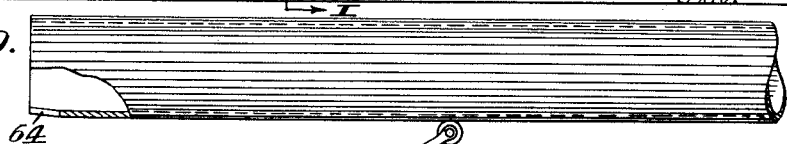
INVENTOR
George E. Mirfield
by his attorneys
Byrnes, Stebbins & Blenko

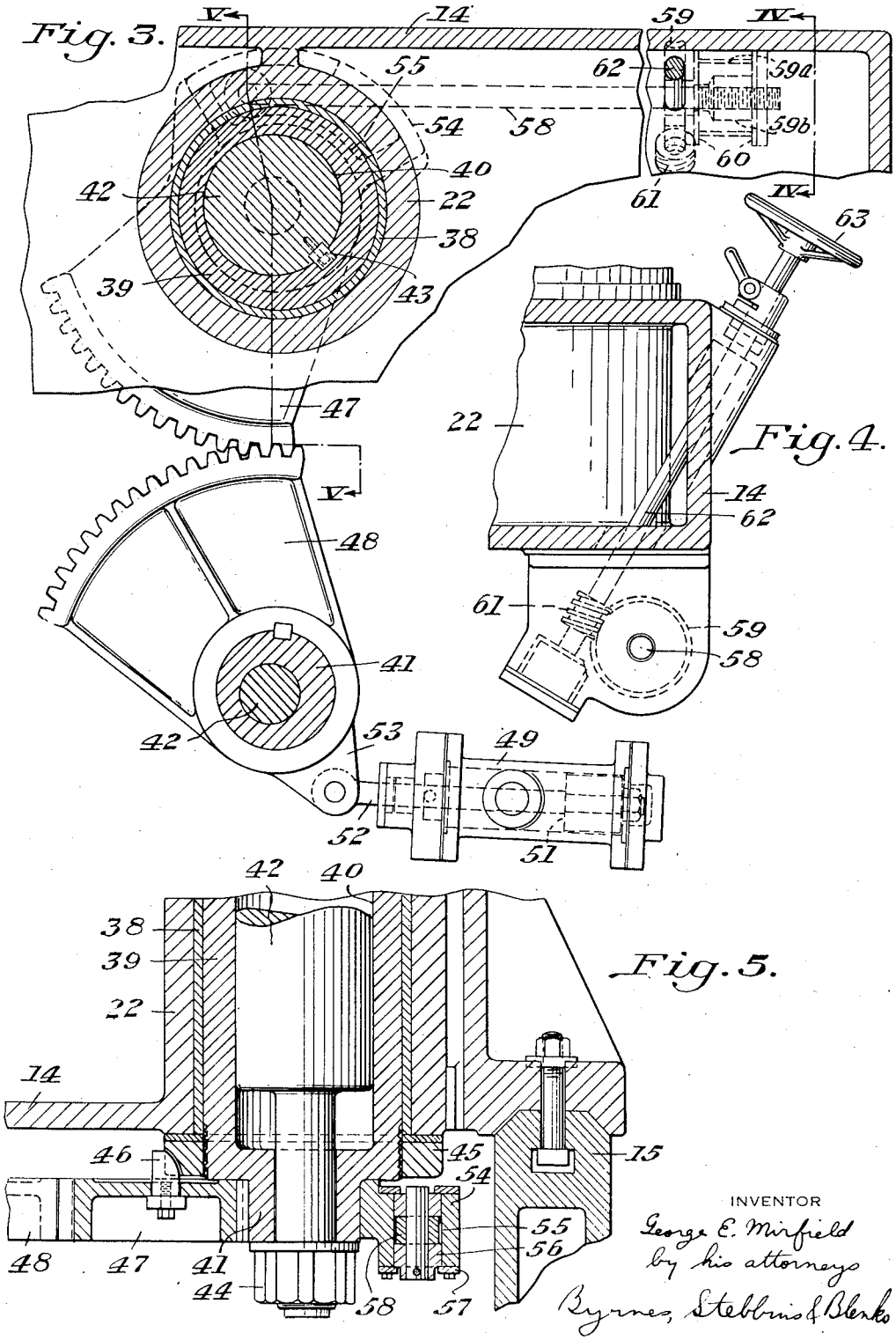

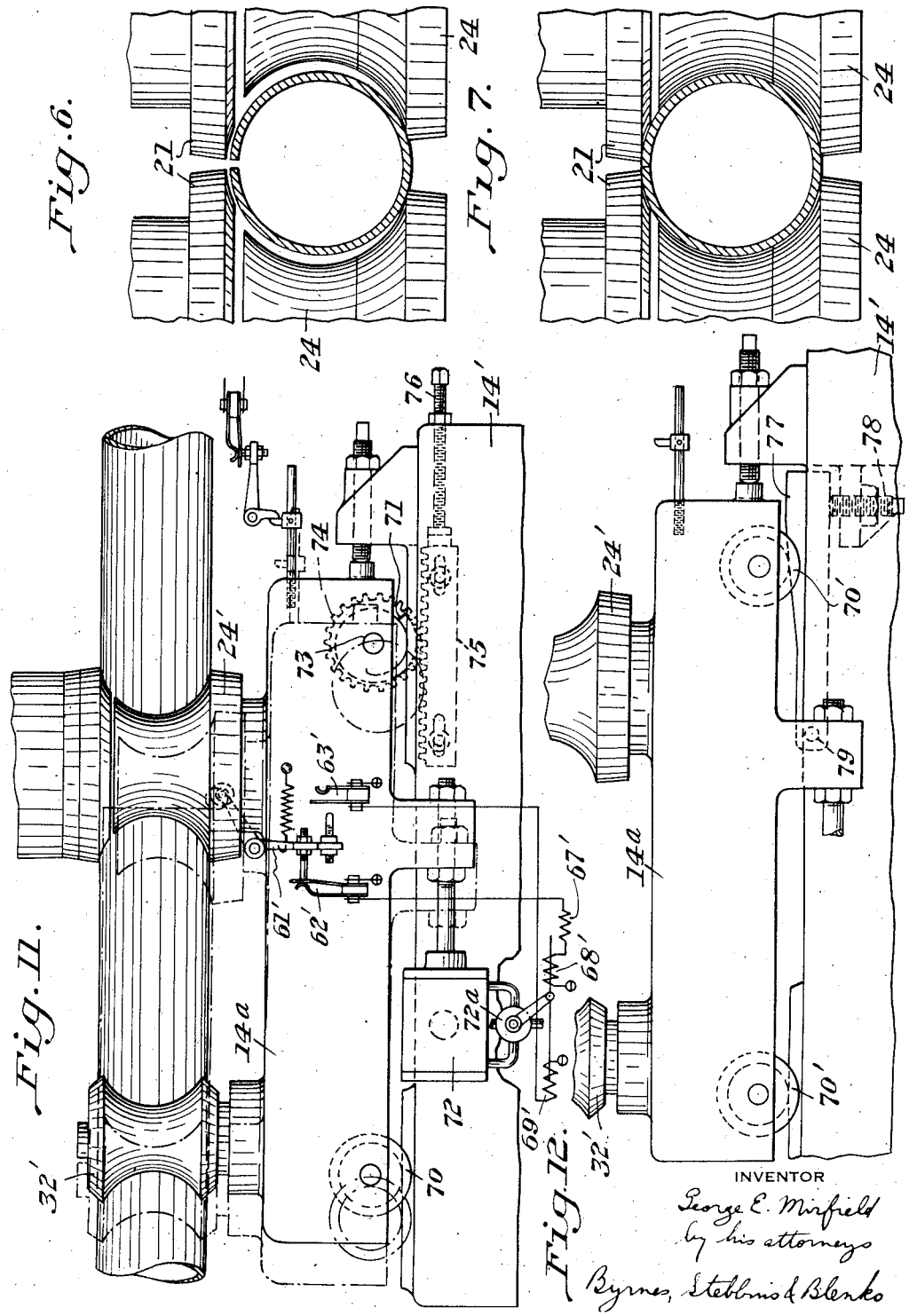

Patented May 11, 1937

2,079,916

UNITED STATES PATENT OFFICE 2,079,916

WELDING APPARATUS

George E. Mirfield, Youngstown, Ohio, assignor, by mesne assignments, to Direct Current Welding Company, a corporation of Delaware Application February 26, 1934, Serial No. 712,917

13 Claims. (Cl. 219—6)

My invention relates to electric welding and, in particular, to resistance welding. It is disclosed herein as applied to the manufacture of pipe by welding together the edges of an axial seam cleft in a tube blank formed by bending the side edges of a flat plate toward each other into cylindrical form. The invention is applicable, however, to the welding of seams in other types of material.

In the art of continuous resistance welding as practiced heretofore, it has been customary to supply welding current to the metallic edges to be joined by rotary electrodes engaging the edges. Because of the large welding currents required, the electrodes must be of highly conducting material, such as copper. Electrodes of copper have the disadvantage characteristic of the metal in that they are soft, easily dented and abraded. It is obvious that a tube blank of considerable weight moving at high speed into a welding apparatus will work serious injury to a copper electrode in the path thereof unless accurately guided. The possibility of injury to the electrode is increased by the fact that the edges of the tube blanks are usually rough and sharp. Even with the most accurate guiding, the danger of electrode injury is not entirely overcome since the spring of the cylindrically formed blank may be sufficient to cause the leading edges thereof to gouge the surface of the electrode on coming into contact therewith.

It is necessary to preserve a smooth contact surface on the electrodes in order to make a uniform weld. Frequent re-surfacing of an electrode is objectionable because it necessitates either the stoppage of production or the removal of the electrode from the welder, either of which is highly undesirable. The electrodes, furthermore, because of the nature of the material of which they are composed and their size, are quite costly.

I have invented a method and apparatus for welding which preclude all possibility of injury to the electrodes by the advancing blanks. Specifically, the invention comprises a method of and means for feeding the leading end of the blank past the electrodes out of contact therewith and then moving the blank toward the electrodes for tangential engagement therewith. The apparatus of my invention includes a pair of disc electrodes rotatable in a common plane about parallel axes, the electrodes being shaped and positioned for tangential, peripheral engagement with the tube blanks. Pressure rolls substantially coaxial with the electrodes, cooperate therewith to form a welding throat. The pressure rolls are movable either longitudinally or laterally of the path of movement of the blanks, the result of such movement being to permit the leading ends of the blanks to sag slightly below the edges of the electrodes and pass the electrodes out of contact therewith. Return movement of the pressure rolls moves the blanks into engagement with the electrodes and the welding commences immediately.

The invention also comprises automatic means controlled by movement of the tube blanks for effecting the mechanical operations outlined above. The invention also provides means for controlling the supply of welding current to the work, the supply of current being initiated only after the leading ends of the blanks have passed the electrodes and being terminated before the trailing ends of the blanks reach the electrodes. This prevents arcing and burning which would, of course, injure the electrode surfaces. This phase of the invention is claimed in my copending application Serial No. 49,937, filed Nov. 15, 1935.

For a complete understanding of the invention, reference should be made to the accompanying drawings illustrating a present preferred embodiment of the invention, together with certain modifications.

In the drawings:—

Figure 2 is a sectional view along the line II—II of Figure 1, parts being shown in elevation; the line I—I of Figure 2 indicates approximately the plane on which the section of Figure 1 is taken;

Figure 3 is a partial sectional view substantially along the plane of line III—III of Figure 1;

Figure 4 is a partial sectional view along the line IV—IV of Figure 3;

Figure 5 is a partial sectional view along the line V—V of Figure 3;

Figure 6 is a partial elevation showing a portion of Figure 1 to enlarged scale, the pressure rolls being in retracted position;

Figure 7 is a view similar to Figure 6 showing the pressure rolls in closed position;

Figure 8 is a schematic diagram showing the automatic control circuit;

Figure 9 is a schematic view showing the operation of the automatic control mechanism;

Figure 10 is a detail of the trailing end of a pipe blank;

Figure 11 is a side elevation similar in general to Figure 2 showing a modified construction; and Figure 12 is a view similar to Figure 11 showing a further modified construction.

Figure 1:
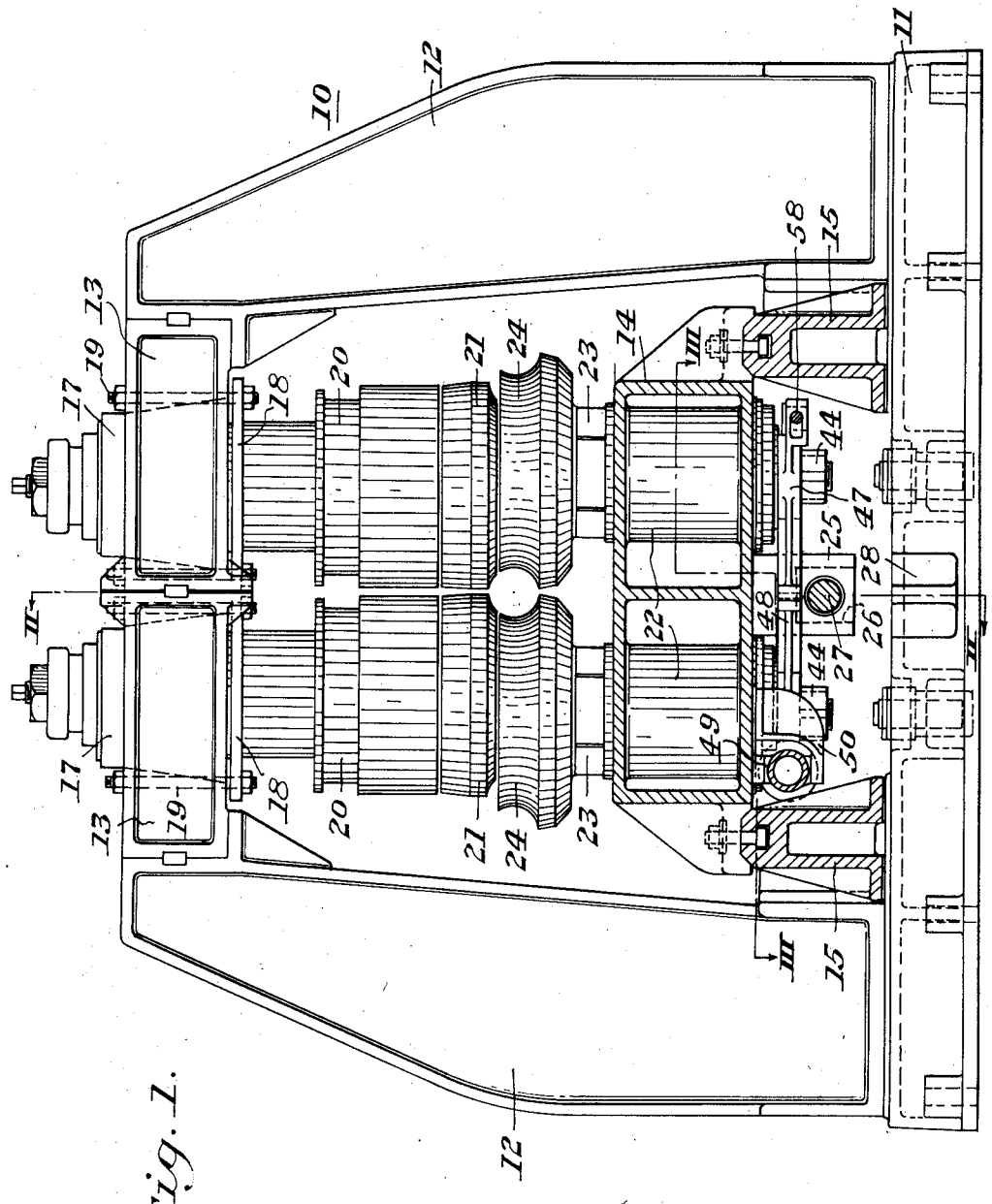
Figure 1 is a view in elevation along the line of travel of the pipe blanks, showing the welder of my invention, parts being shown in section.

Referring in detail to the drawings and, for the present, especially to Figures 1 and 2, the welder of my invention, indicated generally at 10, comprises a bedplate 11, columns 12 extending upwardly therefrom, bearing chucks 13 mounted between the upper ends of the columns 12, and a base 14 slidable on rails 15 secured to the bedplate 11. The bearing chucks 13 are insulated from the columns 12 and from each other and have terminals 16 projecting therefrom provided with slots adapted to receive copper-strap conductors for delivering welding current, as disclosed in the copending application of Carl G. Jones, Serial No. 706,960, filed January 17, 1934, for Method and apparatus for electric welding. Bearing housings 17 are suspended in the chucks 13 by means of plates 18 and studs 19. Electrode shaft assemblies 20 are journaled in bearings in the housings 17, the electrodes proper being indicated at 21. The welding current is conducted from the terminals 16 through the bearing chucks 13, the bearing housings 17, the assemblies 20 to the electrodes 21.

Bearing housings 22 are formed in the base 14 and provide a rotatable mounting for shaft assemblies 23 carrying pressure rolls 24. The shaft assemblies will be described in greater detail later. A yoke 25 extending downwardly from the base 14 carries a nut 26 with which a threaded shaft 27 cooperates. The shaft 27 is journaled at one end in a thrust bearing 28 secured to the bedplate 11 and in the other end in a reduction gear housing 29 mounted on an extension of the bedplate. A motor 30 is connected to the reduction gear 29 to operate the screw shaft 27 for adjustment of the base 14 along the line of travel of the tube blanks.

The base 14 is also provided with an outward extension 31 supporting entering guide rolls 32. The rolls 32 are journaled in bearings 33 mounted in blocks 34. The blocks 34 are adjustable toward and away from each other by a transverse screw 35, and the two rolls are adjustable as a unit long the line of travel of the tube blanks on rails 36 by means of a screw 37.

Referring now to Figures 3 through 5 for a detailed description of the bearing housings 22 and the shaft assemblies contained therein, which include the means for opening and closing the pressure rolls, the housings 22 are provided with bushings 38. Sleeves 39 having eccentric bores 40 and reduced extensions 41 are rotatably disposed in the bushings 38. Roll shafts 42 are positioned in the eccentric bores 40 of the sleeves 39 and are keyed thereto by keys 43. The sleeves 39 are supported by vertical thrust bearings included in the assemblies 23, which may be of any convenient type and are, therefore, not illustrated in detail. The pressure rolls 24 are similarly disposed on the upper ends of the shafts 42 for rotation relative thereto. The shafts 42 have reduced, threaded ends projecting through the extensions 41 on the sleeves 39 and are secured therein by nuts 44.

Collars 45 are threaded onto the lower ends of the sleeves 39. Meshing gear segments 47 and 48 are keyed to the extensions 41. Keys 46 secured to the gear segments engage the collars 45 to insure that they turn with the sleeves 49, to prevent the collars from working tight on the sleeves. It will be obvious that on rotation of the segments 47 and 48, the eccentricity of the shafts 42 with respect to the sleeves 39 will cause the former to move toward each other. Figure 3 shows the gear segments positioned to produce the maximum spacing between the centers of the shafts 42.

A cylinder 49 is trunnioned between the bottom of the base 14 and a bracket 50 depending therefrom. The cylinder has a piston 51 and a piston rod 52. The latter is pivoted to an extension 53 from the gear segment 48. Fluid connections (not shown) are provided for operating the piston 51 in the cylinder 49 and thereby swinging the meshing gear segments 47 and 48 to close and open the pressure rolls 24.

The gear segment 47 has an extension 54 with an arcuate slot 55 therein. A stop block 56 slides in the slot 55, being retained therein by gibs 57. The block 56 is pinned to a link 58. The end of the link 58 remote from the block 56 is threaded, and extends through a worm wheel 59. The worm wheel is mounted on a sleeve 59a rotatably supported in bearings 60. The sleeve 59a carries a nut 59b threaded on the link 58. A worm 61 is carried on a shaft 62 extending downwardly through one side wall of the base 14. By means of a hand wheel 63, the position of the block 56 may be adjusted to vary the limits of movement of the gear segments 47 and 48.

Figure 6 illustrates the pressure rolls 24 when separated. A pipe blank entering the welder will pass the guide rolls 32 and the leading end thereof will sag somewhat by reason of its own weight, if the pressure rolls 24 are withdrawn, so that the leading end of the pipe will pass beyond the electrodes 21 without engaging them. The pressure rolls are then closed, as shown in Figure 7, with the result that the tube blank is lifted into engagement with the electrodes and the seam cleft closed for the commencement of the welding operation. This sequence of events may be brought about automatically, as shown in Figures 8 through 10.

A flag switch 61 having front contacts 62 and back contacts 63, is disposed on the base 14 so that it will be actuated to close its front contacts when the leading end of a blank has passed beyond the electrodes. The back contacts 63 are closed when the blank passes out of the welder. The flag switch 61 controls the movement of the pressure rolls and the supply of welding current to the electrodes. In order to prevent arcing as the trailing end of the blank leaves the welder, I preferably notch the trailing end of the blank at a point opposite the seam cleft, as shown at 64 in Figures 9 and 10, to permit advance operation of the flag switch. The contacts 62 are thus opened and the contacts 63 closed before the trailing end of the blank actually leaves the electrodes.

In Figure 8, the switch 61 and other elements are shown schematically. Welding current is supplied to the electrodes 21 from a generator 65 through a switch 66 having an operating coil 67 with an inherent time delay. Valve operating magnets 68 and 69 control the supply of fluid to the cylinder 49 for operating the gear segments 47 and 48.

Normally, the contacts 63 are closed to energize the magnet 69 to shift the segments 47 and 48 so that the rolls 24 are retracted. If a formed tube blank is fed to the electrode by the usual feeding and guiding rolls, it will operate the flag switch 61 in the manner already indicated after the sagging leading end has passed beyond the electrodes out of contact therewith. The switch 61 is positioned with regard to the speed of movement of the pipe and the time required for the subsequent operations to take place, so that the pressure rolls will be closed and the welding current supplied to the electrodes as soon as possible after the leading end of the pipe has passed the center line of the electrodes. The movement of the switch 61 caused by the advancing blank, opens the contacts 63 and closes the contacts 62. The magnet 69 is thereupon energized and the magnet 68 deenergized. At the same time, the operating coil 67 of the switch 66 is energized and after a predetermined time, the switch is closed, connecting the electrodes to the welding generator. Instead of connecting the operating coil of the switch in series with the electromagnetic valve 68, a relay may be interposed with appropriate time delay characteristics.

Conditions remain unchanged as long as the blank moves through the electrode until the notch 64 reaches the switch 61. The latter thereupon returns to its original position. The pressure rolls are separated in the manner already explained and the switch 66 is opened before the trailing end of the blank passes entirely out of contact with the electrodes.

In a modified form of my invention, shown in Figure 11, the pressure rolls are not spread laterally but are moved along the path of travel of the blank and are raised and lowered during the course of such movement. In Figure 11, pressure rolls 24' and guide rolls 32' are journaled on a carriage 14a traveling on a base 14'. The carriage 14a is supported on grooved rollers 70 at one end and cam rollers 71 at the other end. A fluid cylinder 72, corresponding to the cylinder 49, and controlled by a valve 72a, is provided for shifting the carriage from the solid-line to the dotted-line position, and vice versa. The cam rollers 71 are keyed to a shaft 73. A gear 74 is also keyed to this shaft and cooperates with an adjustable rack bar 75. The gear and rack bar insure rotation of the cam rollers on movement of the carriage 14a. The extent to which the rolls 24' are raised by movement of the carriage may be controlled by a screw 76 for adjusting the rack bar 75.

The flag switch and control circuit for operating the cylinder 72 and the main switch are duplicated in Figure 11, the various parts being designated by corresponding reference numerals primed.

Figure 12 illustrates a further modification which is similar to that of Figure 11 except that the carriage 14a is supported at both ends by grooved rollers 70'. The base 14' is provided with an adjustable cam 77 on which the rollers 70' at one end of the carriage travel. Forward and reverse movement of the carriage, as explained above, cause up and down travel of the rolls 24'. The adjustment of the cam 77 is effected by a screw 78, the cam surface being pivoted to a base 14' at 79. The operation of the modifications of Figures 11 and 12 are similar in effect to that of the preferred embodiment. The pressure rolls are normally retracted and lowered. When the blank advances and operates the switch 61, the fluid cylinder 72 causes the carriage 14a to advance, raising the blank from a position such as that shown at Figure 6 to a position such as that shown at Figure 7 and bringing the edges of the seam cleft into firm engagement with the peripheries of the electrodes. The reverse operation is similarly accomplished automatically. Similar results are thus obtained from the different modifications, the essential difference being that in one case, namely, the apparatus of Figures 1 through 5, the raising of the blank is effected by bringing the pressure rolls together, whereas in the other cases, Figures 11 and 12, the blank is raised by elevating the pressure rolls themselves slightly as they advance from retracted to operating position.

In Figure 11, I show a second flag switch operated by movement of the carriage 14a. This switch may be used to cause operation of the main welding switch instead of the time delay relay or operating coil 67.

It will be apparent that the invention provides a novel method and means for the electric welding of seam edges by which the injury to the electrodes experienced heretofore is entirely avoided. Longer life of the electrodes is thus assured and the cost of operation is thereby reduced. The necessary operations can be performed automatically so that they do not add any complications to the resistance welding process as heretofore carried on.

It will be obvious that while I have shown disc electrodes rotatable in a common plane about spaced parallel axes, the invention is equally applicable to other types of electrodes such as that in which the discs are secured together but insulated from each other and rotate about a common axis.

Although I have illustrated and described but one preferred embodiment of the method and apparatus with certain modifications of the latter, it will be apparent that variations in the construction of the apparatus and the practice of the method described may be made without departing from the spirit of the invention or the scope of the appended claims.

I claim:

1. In an electric welder, the combination with welding electrodes and pressure rolls cooperating therewith for welding plate edges together, of means providing a movable mounting for said rolls, means for so moving said rolls as to cause advancing edges to pass the electrodes out of contact therewith, and means actuated by movement of the work for controlling the roll-moving means.

2. In an electric welder, a pair of electrodes for engaging metallic edges to be joined, pressure rolls cooperating with said electrodes, movable supports for said pressure rolls, means for moving said supports to cause said edges to pass beyond said electrodes before engaging them, and means actuated by the movement of the work for controlling said last-mentioned means.

3. In an electric welder, the combination with electrodes adapted to engage edges to be joined, and pressure rolls cooperating with said electrodes, means for moving said pressure rolls laterally to permit the advancing edges to progress beyond the electrodes out of contact therewith, and means actuated by movement of the work for controlling the roll-moving means.

4. In an electric welder, the combination with electrodes adapted to engage metallic edges to be joined, and pressure rolls for forcing said edges together, of means for separating said pressure rolls permitting said edges to progress clear of said electrodes, and means actuated by the movement of the work for controlling the last-mentioned means.

5. In an electric welder, a pair of electrodes adapted to engage advancing edges to be joined, pressure rolls cooperating with said electrodes and effective for forcing said edges together in welding engagement, supports for said pressure rolls movable along the path of travel of said edges, and means for causing movement of said pressure rolls toward and away from said electrodes on movement of said supports.

6. The apparatus defined by claim 5 wherein the means for causing movement of the pressure rolls toward or from the electrodes includes an adjustable cam.

7. In an electric welder, the combination with electrodes adapted to engage advancing edges to be joined, pressure rolls cooperating therewith for applying welding pressure to said edges, of means for moving said pressure rolls relative to said electrode, and means controlled by the forward movement of the material to be welded for causing operation of said pressure roll moving means.

8. The combination defined in claim 7 characterized by the fact that the means controlling the movement of the pressure rolls also controls the initiation of welding current.

9. In an electric welder, a pair of opposed pressure rolls rotatable about substantially parallel axes, and means maintaining said rolls for movement toward and away from each other including eccentric bearings, and means for simultaneously rotating the bearings of both said rolls.

10. The apparatus defined by claim 9 wherein said means for simultaneously rotating said bearings includes meshing gear segments keyed thereto.

11. In an apparatus for electrically welding successively a plurality of seams of limited length, the combination with a pair of opposed pressure rolls, and means for causing movement of said rolls toward and away from each other, of means operative at least once during the passage of each seam through the welder for actuating said roll-moving means.

12. The apparatus defined by claim 9 characterized by a fluid-pressure cylinder and piston connected eccentrically to one of said bearings for rotating it.

13. The apparatus defined by claim 9 characterized by an adjustable check and means between the bearings and check whereby to limit rotation of said bearings.

GEORGE E. MIRFIELD.